US012624503B2

(12) United States Patent (10) Patent No.: US 12,624,503 B2
Evans et al. (45) Date of Patent: May 12, 2026

(54) COMPOSITION FOR IMPROVING SOFTNESS OF TISSUE AND/OR TOWEL PRODUCTS

(71) Applicant: SOLENIS TECHNOLOGIES, L.P., Wilmington, DE (US)

(72) Inventors: Michael A. Evans, Newark, DE (US); Clement L. Brungardt, Oxford, PA (US); Patrick R. Kovacs, Newark, DE (US); David A. Gerstenhaber, Landenberg, PA (US)

(73) Assignee: Solenis Technologies, L.P., Wilmington, DE (US)

( * ) Notice: Subject to any disclaimer, the term of this patent is extended or adjusted under 35 U.S.C. 154(b) by 277 days.

(21) Appl. No.: 18/161,947

(22) Filed: Jan. 31, 2023

(65) Prior Publication Data

US 2023/0243102 A1 Aug. 3, 2023

Related U.S. Application Data

(60) Provisional application No. 63/267,311, filed on Jan. 31, 2022.

(51) Int. Cl.
D21H 17/55 (2006.01)
C08G 69/26 (2006.01)
(Continued)

(52) U.S. Cl.
CPC ........... D21H 17/55 (2013.01); C08G 69/265 (2013.01); C08G 69/28 (2013.01); D21H 21/22 (2013.01); D21H 23/04 (2013.01)

(58) Field of Classification Search
CPC ........ D21H 17/07; D21H 17/14; D21H 17/56; D21H 21/16; D21H 17/55; D21H 27/002;
(Continued)

(56) References Cited

U.S. PATENT DOCUMENTS 4,240,935 A 12/1980 Dumas
5,656,699 A 8/1997 Dasgupta et al.
(Continued)

FOREIGN PATENT DOCUMENTS

EP 0851061 A2 7/1998
JP 59030997 A * 2/1984

OTHER PUBLICATIONS

English translation of JPS 5930997A retrieved from Espacenet (Year: 2025).*

(Continued)

*Primary Examiner* — Abbas Rashid

*Assistant Examiner* — Elisa H Vera

(74) *Attorney, Agent, or Firm* — Ingrassia Fisher & Lorenz LLP

(57) ABSTRACT

A composition for improving softness of tissue and/or towel products includes lignocellulosic fibers; water; and a hydrophobic softener that includes the reaction product of: (1) at least one di- and/or poly-amine, (2) at least one chain extender having at least two carboxyl groups; and (3) at least one hydrophobic end-capper. The reaction product comprises a hydrophobic substitution of at least about 25 mole percent of the hydrophobic end-capper based on a total number of moles of active amine sites of the reaction product. In addition, a method of improving softness of tissue and/or towel products includes combining the lignocellulosic fibers, the water, and the hydrophobic softener; and creating the tissue and/or towel products.

20 Claims, 7 Drawing Sheets

(51) Int. Cl.
 *C08G 69/28* (2006.01)
 *D21H 21/22* (2006.01)
 *D21H 23/04* (2006.01)

(58) Field of Classification Search
 CPC ...... D21H 21/22; D21H 23/04; C08G 69/265;
 C08G 69/28; C08G 73/028
 See application file for complete search history.

(56) References Cited

U.S. PATENT DOCUMENTS

| | | |
|---|---|---|
| 9,719,212 B2 | 8/2017 | Crisp et al. |
| 2009/0014139 A1 | 1/2009 | Tamai et al. |
| 2010/0122785 A1 | 5/2010 | Grigoriev et al. |
| 2019/0031802 A1 | 1/2019 | Gu et al. |
| 2019/0099979 A1 | 4/2019 | Bee et al. |
| 2020/0149223 A1 | 5/2020 | Lu et al. |

OTHER PUBLICATIONS

ISA/US, International Search Report and Written Opinion issued in Int. Appl. No. PCT/US2023/061643 mailed May 15, 2023.

\* cited by examiner

| Softener | Addition Level | Mole % Hydrophobe | Weight % Hydrophobe | TSA-S7 | TSA-D[mm/N] |
|---|---|---|---|---|---|
| None | - | - | - | 24.21 | 2.119 |
| ProSoft TQ218 | 2 ppt | - | - | 20.45 | 2.271 |
| 2:1:1.9 DETA:Adipic Acid:Oleic Acid | 2 ppt | 39% | 60% | 21.93 | 2.235 |
| 5:3:3.8 DETA:Adipic Acid:Oleic Acid | 2 ppt | 32% | 53% | 21.661 | 2.245 |
| 3:2:1.9 DETA:Adipic Acid:Oleic Acid | 2 ppt | 27% | 47% | 21.294 | 2.248 |
| none | - | - | | 22.7 | 2.211 |
| ProSoft TQ218 | 3 ppt | - | - | 19.02 | 2.383 |
| 2:1:1.9 DETA:Adipic Acid:Oleic Acid | 3 ppt | 39% | 60% | 18.86 | 2.389 |
| 5:3:3.8 DETA:Adipic Acid:Oleic Acid | 3 ppt | 32% | 53% | 18.66 | 2.368 |
| 3:2:1.9 DETA:Adipic Acid:Oleic Acid | 3 ppt | 27% | 47% | 19.07 | 2.34 |
| none | - | - | | 20.4 | 2.28 |
| ProSoft TQ218 | 4 ppt | - | - | 18.9 | 2.386 |
| 2:1:1.9 DETA:Adipic Acid:Oleic Acid | 4 ppt | 39% | 60% | 19.47 | 2.414 |
| 5:3:3.8 DETA:Adipic Acid:Oleic Acid | 4 ppt | 32% | 53% | 18.95 | 2.448 |
| 3:2:1.9 DETA:Adipic Acid:Oleic Acid | 4 ppt | 27% | 47% | 18.19 | 2.431 |

*FIG. 2*

| Softener | Addition Level | Mole % Hydrophobe* | Weight % Hydrophobe | TSA-S7 | TSA-D[mm/N] |
|---|---|---|---|---|---|
| none | - | - | - | 20.72 | 2.305 |
| ProSoft TQ218 | 2 ppt | - | | 18.21 | 2.387 |
| 3:2:1.9 DETA:Adipic Acid:Oleic Acid | 2 ppt | 27% | 47% | 18.91 | 2.367 |
| 5:4:1.9 DETA:Adipic Acid:Oleic Acid | 2 ppt | 17% | 33% | 18.81 | 2.378 |
| 7:6:1.9 DETA:Adipic Acid:Oleic Acid | 2 ppt | 13% | 25% | 19.85 | 2.326 |
| 9:8:1.9 DETA:Adipic Acid:Oleic Acid | 2 ppt | 10% | 20% | 19.91 | 2.351 |
| 11:10:1.9 DETA:Adipic Acid:Oleic Acid | 2 ppt | 8% | 17% | 20.6 | 2.291 |

FIG. 3

| Softener | Addition Level | Mole % Hydrophobe* | Weight % Hydrophobe | TSA-S7 | TSA-D[mm/N] |
|---|---|---|---|---|---|
| none | - | - | - | 21.88 | 2.228 |
| ProSoft TQ218 | 2 ppt | - | | 19.31 | 2.4 |
| 2:1:1.5 DETA:Adipic Acid:Oleic Acid | 2 ppt | 33% | 55% | 19.99 | 2.353 |
| 3:2:1.5 DETA:Adipic Acid:Oleic Acid | 2 ppt | 23% | 41% | 20.14 | 2.352 |
| 5:4:1.5 DETA:Adipic Acid:Oleic Acid | 2 ppt | 14% | 28% | 21.53 | 2.279 |
| 9:8:1.5 DETA:Adipic Acid:Oleic Acid | 2 ppt | 8% | 17% | 21.1 | 2.307 |

*FIG. 4*

| Softener | Addition Level | Mole % Hydrophobe* | Weight % Hydrophobe | Handle-o-Meter Softness |
|---|---|---|---|---|
| Water treated "Blank" | - | - | - | 5.1 |
| ProSoft TQ218 | 5 ppt | - | - | 3.84 |
| 2:1:1.5 DETA:Succinic Acid:Oleic Acid | 5 ppt | 33% | 57% | 3.89 |
| 4:3:1.5 DETA:Succinic Acid:Oleic Acid | 5 ppt | 18% | 36% | 4.06 |
| 6:5:1.5 DETA:Succinic Acid:Oleic Acid | 5 ppt | 12% | 26% | 4.38 |
| 11:10:1.5 DETA:Succinic Acid:Oleic Acid | 5 ppt | 7% | 16% | 4.43 |

*FIG. 5*

| Softener | Addition Level | Mole % Hydrophobe* | Weight % Hydrophobe | TSA-S7 | TSA-D[mm/N] |
|---|---|---|---|---|---|
| none | - | - | - | 20.93 | 2.223 |
| ProSoft TQ218 | 2 ppt | - | | 19.49 | 2.303 |
| 2:1:1.9 DETA:Adipic Acid:Stearic Acid | 2 ppt | 33% | 55% | 19.91 | 2.313 |
| 3:2:1.9 DETA:Adipic Acid:Stearic Acid | 2 ppt | 23% | 41% | 19.47 | 2.291 |
| 5:4:1.9 DETA:Adipic Acid:Stearic Acid | 2 ppt | 14% | 28% | 19.55 | 2.299 |
| 7:6:1.9 DETA:Adipic Acid:Stearic Acid | 2 ppt | 10% | 21% | 19.86 | 2.252 |
| 9:8:1.9 DETA:Adipic Acid:Stearic Acid | 2 ppt | 8% | 17% | 20.76 | 2.249 |

*FIG. 6*

| Softener | Addition Level | Mole % Hydrophobe* | Weight % Hydrophobe | H-o-M | TSA-S7 | TSA-D[mm/N] |
|---|---|---|---|---|---|---|
| none | - | - | - | 2.37 | 17.9 | 2.23 |
| ProSoft TQ218 | 4 ppt | - | - | 1.987 | 16.2 | 2.39 |
| 8 parts - 1.8:11:4:6 stearic acid:DETA: $C_{36}$ dimer acid:adipic acid<br><br>2 parts - 1.8:11:10 stearic acid:DETA: adipic acid | 4 ppt | 31%* | 48% | 2.02 | 17.7 | 2.36 |

*FIG. 7*

COMPOSITION FOR IMPROVING SOFTNESS OF TISSUE AND/OR TOWEL PRODUCTS

CROSS-REFERENCE TO RELATED APPLICATIONS

This application claims the benefit of U.S. Provisional Application No. 63/267,311, filed Jan. 31, 2022, which is expressly incorporated herein by reference in its entirety.

TECHNICAL FIELD

The present disclosure generally relates to a composition for improving the softness of tissue and/or towel products. More specifically, this disclosure relates to use of a particular composition that is free of a non-ionic surfactant, includes a hydrophobic softener that has a high percentage of hydrophobic substitution, and that has improved toxicity profiles.

BACKGROUND

Softeners are often used to improve the softness and hand-feel of bath, towel, and facial tissue. One of the most widely used tissue softeners is made using a condensation reaction process. First, one mole of diethylenetriamine (DETA) is reacted with 1.5 to 2.0 moles of a fatty acid (e.g. oleic acid, 0.75 to 1.0 equivalents based on the two primary amines present on DETA). The reaction product is a mixture of mono-amides and bis-amides. The process may optionally be adjusted with additional heat and the application of vacuum to drive the intermediate material to cyclize, forming imidazoline moieties. The remaining primary and secondary amines are then reacted with diethyl sulfate (DES) or dimethyl sulfate (DMS) quaternizing agents to form cationic quaternary amines, completing the synthesis.

Two aspects of the softener's chemical structure affect its performance. First, a cationic charge on the softener interacts strongly with anionically charged lignocellulosic fibers used to make bath, towel, and facial tissue. This interaction helps retain the softener in the tissue during sheet formation in a wet-end of a paper machine. Second, the reaction with DES tends to lowers the melting point of the final softener, making it easier to emulsify in the tissue mill.

Although such products have been commercially successful for many years, the use of diethyl/dimethylsulfate quaternizing agents has come under increased regulatory scrutiny, particularly in California wherein a California Proposition 65 warning is required. Moreover, such products are categorized in GHS Classification Category 1 with regard to aquatic toxicity.

Mixtures of mono- and bis-amides formed by the reaction of oleic acid and DETA have been theorized to be effective tissue softeners. Unfortunately, the amides and imidazolines are waxy solids at room temperature which makes them difficult to emulsify in tissue mills. Moreover, only low percent solids emulsions (e.g. 2-3%) can be made even at high emulsification temperatures (e.g. 60-80° C.). Even at low percent solids, such emulsions are stable for less than one day. For these reasons, such compositions are not suitable for use.

Accordingly, there remains an opportunity for improvement. Furthermore, other desirable features and characteristics of the present disclosure will become apparent from the subsequent detailed description of the disclosure and the appended claims, taken in conjunction with the accompanying drawings and this background.

BRIEF SUMMARY

This disclosure provides a composition for improving softness of tissue and/or towel products. The composition includes lignocellulosic fibers; water; and a hydrophobic softener that includes the reaction product of: (1) at least one di- and/or poly-amine, (2) at least one chain extender having at least two carboxyl groups; and (3) at least one hydrophobic end-capper chosen from a fatty acid, an ester of a fatty acid, a fatty acid chloride, a fatty alkyl halide, an epoxide of a hydrocarbon, a carboxylic acid anhydride of a hydrocarbon, and combinations thereof, any one or more of which has from 4 to about 40 carbon atoms. The reaction product comprises a hydrophobic substitution of at least about 25 mole percent of the hydrophobic end-capper based on a total number of moles of active amine sites of the reaction product.

This disclosure also provides a method of improving softness of tissue and/or towel products. The method includes the steps of providing the lignocellulosic fibers; providing the water; providing the hydrophobic softener; combining the lignocellulosic fibers, the water, and the hydrophobic softener; and creating the tissue and/or towel products using the combination of the lignocellulosic fibers, the water, and the hydrophobic softener.

BRIEF DESCRIPTION OF THE DRAWINGS

The present disclosure will hereinafter be described in conjunction with the following drawing figures, wherein like numerals denote like elements.

FIG. 2 is a Table setting forth the compositions and physical properties of Example D;

FIG. 3 is a Table setting forth the compositions and physical properties of Example E;

FIG. 4 is a Table setting forth the compositions and physical properties of Example F;

FIG. 5 is a Table setting forth the compositions and physical properties of Example G;

FIG. 6 is a Table setting forth the compositions and physical properties of Example H; and FIG. 7 is a Table setting forth the compositions and physical properties of Example I

DETAILED DESCRIPTION

Figures 1A, 1B, 1C:
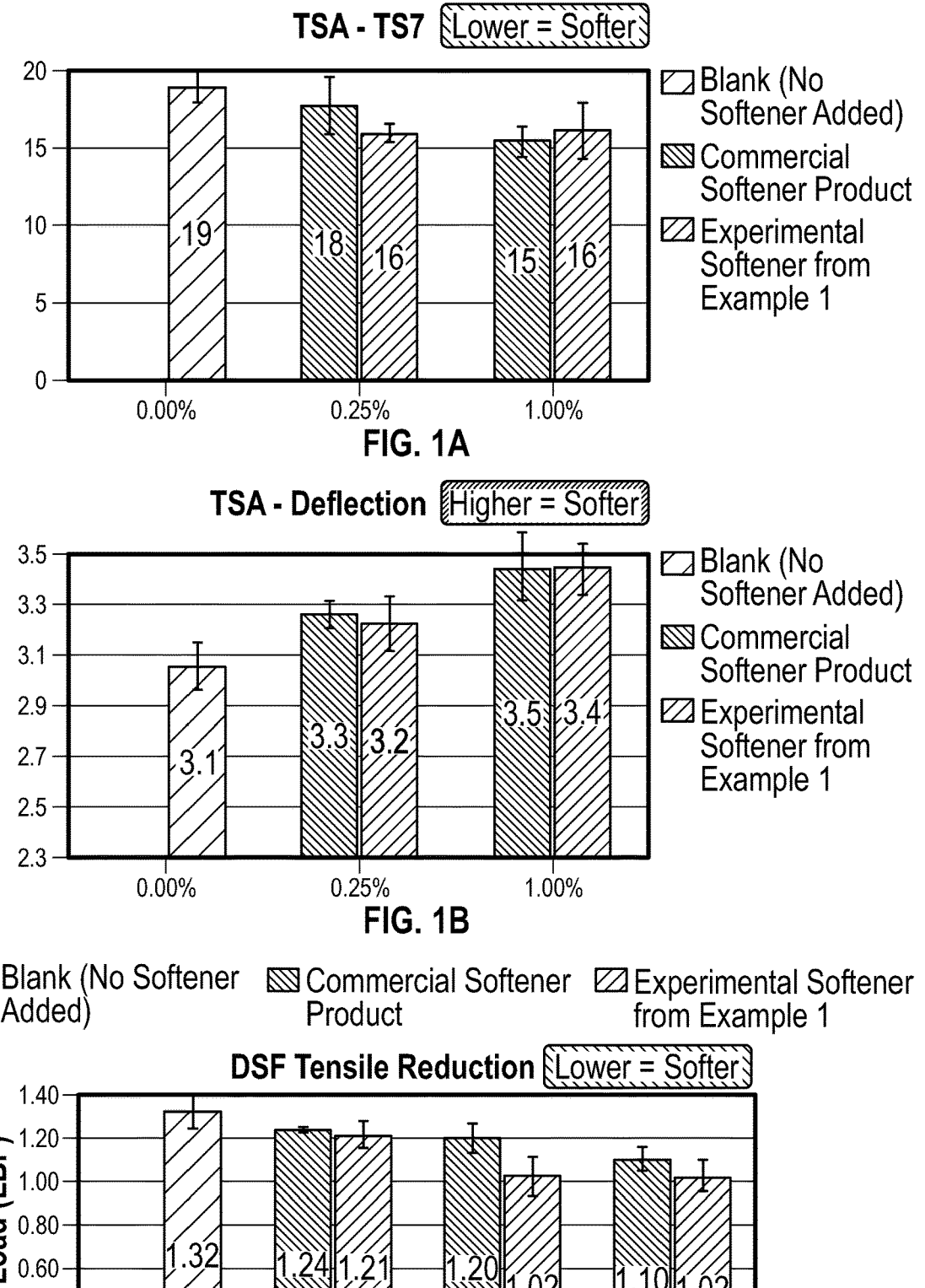
FIG. 1A is a bar graph showing the results of the surface softness evaluations of Example 1.
FIG. 1B is a bar graph showing the results of the deflection evaluations of Example 1.
FIG. 1C is a bar graph showing the results of the tensile strength evaluations of Example 1.

The following detailed description is merely exemplary in nature and is not intended to limit the current composition or method. Furthermore, there is no intention to be bound by any theory presented in the preceding background or the following detailed description.

Embodiments of the present disclosure are generally directed to compositions for improving softness of tissue and/or towel products and methods for forming the same. For the sake of brevity, conventional techniques related to paper making may not be described in detail herein. Moreover, the various tasks and process steps described herein may be incorporated into a more comprehensive procedure or process having additional steps or functionality not described in detail herein. In particular, various steps in the manufacture of towel and tissue products are well-known and so, in the interest of brevity, many conventional steps will only be mentioned briefly herein or will be omitted entirely without providing the well-known process details.

In this disclosure, the terminology "about" can describe values ±0.1, 0.5, 1, 2, 3, 4, 5, 6, 7, 8, 9, or 10%, in various embodiments. Moreover, it is contemplated that, in various non-limiting embodiments, all values set forth herein may be alternatively described as approximate or "about." It is contemplated that all isomers and chiral options, if applicable, for each compound described herein are hereby expressly contemplated for use herein in various non-limiting embodiments.

This disclosure provides a composition for improving softness of tissue and/or towel products. The composition includes lignocellulosic fibers; water; and a hydrophobic softener that includes the reaction product of: (1) at least one di- and/or poly-amine, (2) at least one chain extender having at least two carboxyl groups; and (3) at least one hydrophobic end-capper chosen from a fatty acid, an ester of a fatty acid, a fatty acid chloride, a fatty alkyl halide, an epoxide of a hydrocarbon, a carboxylic acid anhydride of a hydrocarbon, and combinations thereof, any one or more of which has from 4 to about 40 carbon atoms. The reaction product comprises a hydrophobic substitution of at least about 25 mole percent of the hydrophobic end-capper based on a total number of moles of active amine sites of the reaction product. Moreover, the composition does not require the inclusion of nonionic surfactants to be stable and effective. As such, the composition may include, or may be free of, a nonionic surfactant. Each is described in greater detail below.

This disclosure also provides a method of improving softness of tissue and/or towel products. The method includes the steps of providing the lignocellulosic fibers; providing the water; providing the hydrophobic softener; combining the lignocellulosic fibers, the water, and the hydrophobic softener; and creating the tissue and/or towel products using the combination of the lignocellulosic fibers, the water, and the hydrophobic softener. Each is described in greater detail below.

Throughout this disclosure, the terminology "consists essentially of" or "consisting essentially of" typically describes embodiments that are free of, or include less than, 10, 9, 8, 7, 6, 5, 4, 3, 2, 1, 0.5, or 0.1, weight percent of one or more fibers, polymers, additives, surfactants, etc., and/or combinations thereof, that are not described herein or that are described herein as optional. Alternatively, various embodiments are totally free of, i.e., include zero weight percent of, one or more fibers, polymers, additives, surfactants, etc., and/or combinations thereof, that are not described herein or are described herein as optional.

Composition

As first introduced above, this disclosure provides a composition for improving the softness of tissue and/or towel products. The tissue and/or towel product is not particularly limited and may be further defined as a bath tissue, facial tissue, bath towel, etc. The softness of the tissue and/or towel product may be determined by any test known in the art.

For example, in various embodiments, the tissue and/or towel product may have an percentage tensile strength reduction that is minimized. As is known in the art, the typical percentage tensile reduction that is observed varies greatly depending on the type of product that is made.

Ideally, the percentage tensile reduction is reduced as much as possible while still allowing the product to be soft. For example, it is typical to increase softness without weaking the structural strength of the product (excluding surface lubricity, which is part of softness). In these types of evaluations, and as further shown in the Examples, the weakening of the sheet of paper is measured with the assumption by the skilled person that a weaker sheet will translate to becoming a bulkier and therefore softer sheet once a creping process has occurred. In many of the Examples, it is shown that performance of the technology of this disclosure matches or exceeds the performance of comparative/existing softeners while simultaneously improving regulatory and toxicity profiles.

Similar concepts can also apply to measurement of softness relative to deflection using a Tissue Softness Analyzer (TSA) which typically correlates well to tensile strength loss. The skilled person makes the assumption that a weaker sheet deflects more and exhibits a lower breaking strength.

In addition, a surface softness can be measured. The instant technology can provide improvement of softness of, for example, any grade of tissue. However, as is appreciated by the skilled person, there is no set percentage of softness improvement that would be consistent across all grades of tissue and towel.

Percent tensile strength reduction can be determined using a universal tensile testing machine such an Insight 5 SL manufactured by MTS Systems Corporation. A typical measurement may be conducted by first creating 1" by 7" test specimens from the sample to be evaluated. A longitudinal force is gradually be applied to the sample using the tensile tester, and the peak strength before breaking are recorded. Care is taken with regard to the direction the sample is cut. For creped sheets, one might either measure cross-direction (CD) breaking strength, or a the geometric mean of the cross-direction and machine direction (MD) of the sheet. The skilled person is aware of the directionality of the sample and its impact on tensile strength. It should be noted that sheet moisture impacts tensile strength, so typically samples are equilibrated in a constant temperature/constant humidity room prior to evaluation. Furthermore, it is common practice to correct for strength fluctuation caused by variations in basis weight by normalizing the data to a specific basis weight.

Deflection can be determined using a tissue softness analyzer such as an Emtec TSA unit designed to measure and quantify the haptic properties of a tissue product. A specimen is placed within the testing unit such that it is held in a fashion similar to how a drumhead might be mounted to a drum. Just enough tension is applied to the sheet to keep it flat, and the edges are held firmly. The testing unit then applies a set force in the Z-direction, and the amount of deflection (TSA-D) the sample exhibits is typically measured in millimeters per N of pressure applied. Larger deflection values are associated with softer sheets.

Surface Softness can be determined using a tissue softness analyzer such as an Emtec TSA unit designed to measure and quantify the haptic properties of a tissue product. A specimen is placed within the testing unit such that it is held in a fashion similar to how a drumhead might be mounted to a drum. Just enough tension is applied to the sheet to keep it flat, and the edges are held firmly. The testing unit then lowers a testing probe onto the surface of the sheet. The probe is rotated, and the acoustic vibrations are recorded with a sensitive microphone array. The instrument then correlates the acoustic response at about 7,000 Hz to a surface softness and reports the value as the TSA-S7 softness. Acoustic measurements at this frequency are thought to be reflective of the coefficient of friction on the surface of the sheet with lower values equating to a softer sheet.

Another method of quantifying softness is with the use of a Thwing-Albert Handle-O-Meter (HOM). Using an industry standard testing method such as TAPPI T498, this instrument reports the combined effects of the flexibility and surface friction of a sample. That value directly correlates to the perceived softness of the sample being measured, with a lower value equating to a softer sample. A general summary of the test is as follows. A tissue sample is placed on a flat support with a single narrow slot. The sample is narrower than the slot and it extends significantly beyond the slot on both sides. A penetrator beam then pivots on a cam, engaging the sample and forcing it through the slot. The amount of force required to push the sample through the slot is recorded. Typically, rougher samples and stiffer samples will exert greater resistance and are generally considered less soft.

Without intending to be bound by theory, it is believed that the hydrophobic softener acts as a debonder by interacting with the lignocellulosic fibers and disrupting hydrogen bonding therebetween. This then allows the fibers to more easily break down leading to increased softness.

The composition may be, include, consist essentially of, or consist of, lignocellulosic fibers, the water, and the hydrophobic softener.

In one embodiment, the composition includes the lignocellulosic fibers, the water, and the hydrophobic softener.

In another embodiment, the composition consists essentially of the lignocellulosic fibers, the water, and the hydrophobic softener.

In another embodiment, the composition consists of the lignocellulosic fibers, the water, and the hydrophobic softener.

In one embodiment, the composition includes the lignocellulosic fibers, the water, the hydrophobic softener, and one or more additives described below.

In another embodiment, the composition consists essentially of the lignocellulosic fibers, the water, the hydrophobic softener, and one or more additives described below.

In another embodiment, the composition consists of the lignocellulosic fibers, the water, the hydrophobic softener, and one or more additives described below.

In one embodiment, the composition includes the lignocellulosic fibers, the water, the hydrophobic softener, and a stabilizer package described below.

In another embodiment, the composition consists essentially of the lignocellulosic fibers, the water, the hydrophobic softener, and a stabilizer package described below.

In another embodiment, the composition consists of the lignocellulosic fibers, the water, the hydrophobic softener, and a stabilizer package described below.

Moreover, all combinations of the aforementioned components are hereby expressly contemplated for use herein in various non-limiting embodiments.

Lignocellulosic Fibers

The lignocellulosic fibers are not particularly limited and may be any known in the art. For example, the fibers may be derived from, or included in, pulp, which may be used in this disclosure. Alternatively, the fibers may be derived from, or included in, a biomass, which may be used in this disclosure. Alternatively, the fibers may be derived from, or included in, a lignocellulosic material, which may be used in this disclosure.

For example, in various embodiments, a biomass is utilized which can include annual plants and agricultural residues, woody perennials, forestry residues, and trees. In various embodiments, the biomass can be described as wood or wood chips. For example, the wood may be any wood known in the art that is employed in a pulping process. For instance, the wood may include hardwoods, softwoods, or mixtures thereof. In one embodiment, the wood may include primarily coniferous wood (e.g., spruce, fir, pine, etc.) or primarily deciduous wood (e.g. *eucalyptus*, poplar, maple, etc.) Typically, the terminology "lignocellulosic material" and/or "biomass" differs from "pulp" herein because pulp is typically what is formed after the lignocellulosic material/biomass has been at least partially digested.

In other embodiments, pulp is utilized. The pulp is not particularly limited and may include virgin pulp or TMP, NSSC, deinked, or other pulps are used in papermaking. Alternatively, the pulp may include OCC pulp or blends of OCC with virgin pulp, deinked pulp, MOW, NSSC, TMP of other sources of pulp. Still further, the fibers may be cellulosic fibers or cellulose fibers.

The amount of the fibers in the composition is not particularly limited and can change depending on when it is measured, e.g. when the composition is used in a wet web or when placed on drier. In various embodiments, the fibers are present in an amount of about 0.5 to about 3, about 1 to about 2.5, or about 2 to about 2.5, weight percent based on a total weight of the composition. The balance may include water, the softener of this disclosure, and various additives. In various non-limiting embodiments, all values and ranges of values, both whole and fractional, between and including the aforementioned values, are hereby expressly contemplated for use herein.

Water

The amount of water present in the composition is also not particularly limited and can change depending on when it is measured, e.g. when the composition is used in a wet web or when placed on drier. In various embodiments, the water is present in an amount of from about 0.1 to about 99, about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, weight percent based on a total weight of the composition. In various non-limiting embodiments, all values and ranges of values, both whole and fractional, between and including the aforementioned values, are hereby expressly contemplated for use herein.

Notably, the amount of water in the composition described above can be considered independently from an amount of water, e.g. process water, used in papermaking or make be considered one in the same. For example, the composition may include a certain amount of water in itself and then be added to process water in a papermaking process such that the total amount of water relative to other components in the composition is increased.

Hydrophobic Softener

The hydrophobic softener is described as "hydrophobic" because it is appreciated by the person of skill in the art as at least partially immiscible with water. The hydrophobic softener may be, include, consist essentially of, or consist of, the reaction product of: (1) at least one di- and/or polyamine, (2) at least one chain extender having at least two carboxyl groups; and (3) at least one hydrophobic end-capper chosen from a fatty acid, an ester of a fatty acid, a fatty acid chloride, a fatty alkyl halide, an epoxide of a hydrocarbon, a carboxylic acid anhydride of a hydrocarbon, and combinations thereof, any one or more of which has from 4 to about 40 carbon atoms. Each of (1), (2), and (3) are described in greater detail below.

In one embodiment, the hydrophobic softener is the reaction product of (1), (2), and (3).

In one embodiment, the hydrophobic softener includes the reaction product of (1), (2), and (3).

In one embodiment, the hydrophobic softener consists essentially of the reaction product of (1), (2), and (3).

In one embodiment, the hydrophobic softener consists of the reaction product of (1), (2), and (3).

In the hydrophobic softener, (1) and (2) typically react to form a polyamide oligomer backbone and can react via with (3) via condensation polymerization methods known in the art. Without intending to be bound by theory, it is believed that the polyamide oligomer backbone forms a hydrophilic segment that helps to emulsify the hydrophobic softener in the water of the composition and perhaps eventually in water used in a papermaking process. In various embodiments, the polyamide oligomer backbone includes one or more cationically charged secondary or tertiary amine groups that help retain the hydrophobic softener during sheet formation in the wet-end of a paper machine. It is also believed that the hydrophobic softener can act as a surfactant to reduce the surface tension of water used in forming cellulose sheets and softening the resulting products.

The molar ratio of the reactants is not particularly limited. In various embodiments, (1), (2), and (3) are reacted in a molar ratio of about (1 to 3):about 1:about (0.9 to 4). For example, the molar ratio associated with (1) may be from about 1 to about 3, about 1.1 to about 2.9, about 1.2 to about 2.8, about 1.3 to about 2.7, about 1.4 to about 2.6, about 1.5 to about 2.5, about 1.6 to about 2.4, about 1.7 to about 2.3, about 1.8 to about 2.2, about 1.9 to about 2.1, or about 2. Moreover, the molar ratio associated with (2) is about 1, e.g. about 0.9 to about 1.1. Furthermore, the molar ratio associate with (3) may be from about 0.9 to about 4, about 1 to about 3.9, about 1.1 to about 3.8, about 1.2 to about 3.7, about 1.3 to about 3.6, about 1.4 to about 3.5, about 1.5 to about 3.4, about 1.6 to about 3.3, about 1.7 to about 3.2, about 1.8 to about 3.1, about 1.9 to about 3, about 2 to about 2.9, about 2.1 to about 2.8, about 2.2 to about 2.7, about 2.3 to about 2.6, or about 2.5 to about 2.5. In other embodiments, the molar ratio is from about (1.5 to 1.75):about 1: about (1.25 to 1.5). Typically, the ratios will be balanced to improve the self-emulsifying nature of the product while maintaining its ability to impart softness. If the choice of raw materials shifts the hydrophilic-lipophilic balance (HLB) significantly, the aforementioned example ratios may be adjusted beyond the reported ranges in order to maintain these two qualities. In various non-limiting embodiments, all values and ranges of values, both whole and fractional, between and including the aforementioned values, are hereby expressly contemplated for use herein.

In various embodiments, the amount of the hydrophobic softener that is utilized is from about 0.1 to about 40, about 0.1 to about 35, about 0.1 to about 30, about 0.1 to about 25, about 0.1 to about 20, about 0.1 to about 15, about 0.1 to about 10, about 0.1 to about 5, about 0.5 to about 10, about 1 to about 10, about 1 to about 9, about 1 to about 8, about 1 to about 7, about 1 to about 6, about 1 to about 5, about 1 to about 4, about 1 to about 3, about 1 to about 2, about 1.25 to about 5, about 1 to about 4.5 about 1 to about 3.5, about 1 to about 3, about 1 to about 2.5, etc., lbs per one ton of fibers or paper. Alternatively, In various embodiments, the amount of the hydrophobic softener that is utilized is from about 0.005% to about 2%, about 0.025% to about 0.5%, about 0.0625% to about 0.25%, or any amount above divided by 2000lbs×100 to arrive at a weight percent based on a total weight of fibers or paper. In various embodiments, the hydrophobic softener is diluted but this is not required. For example, the hydrophobic softener may be diluted to, e.g. an about 0.25% to about 10% solution, about 1 to about 10% solution, about 1 to about 5% solution, or about 1 to about 2% solution, etc., and then added. In various embodiments, the hydrophobic softener is diluted when spraying on a wet web or spraying on a drier. In other embodiments, the hydrophobic softener is added in a more concentrated form into pulp blenders just before a wet end of a paper machine. In various embodiments, the hydrophobic softener is diluted to improve distribution and efficiency. In various additional embodiments, the dilution is to form a solution of about 0.1 to about 99.9, about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, percent dilution. In various non-limiting embodiments, all values and ranges of values, both whole and fractional, between and including the aforementioned values, are hereby expressly contemplated for use herein.

(1) At Least One Di- and/or Poly-Amine

In other embodiments, (1) may be straight chain or branched and may include, or be free of, cyclic, or other functional groups, including additional amine groups, additional amide groups, additional carboxylic acid groups, carbon-to-carbon double bonds, alcohols, halides, aldehydes, ketones, esters, sulfones, sulfonic acid or other acid derivatives.

In various embodiments, the polyamide oligomer backbone is made with a molar excess of primary amine groups. An excess of primary amine groups ensures that there are sufficient primary amine groups available for reaction with (3). Typically, a molar ratio of primary amine groups on (1) to carboxylic acid groups on (2) is at least about 10:9, about 9:8, about 8:7, about 7:6, about 6:5, about 5:4, about 4:3, about 3:2, about 2:1, or about 1:1, or any range therebetween. In various non-limiting embodiments, all values and ranges of values, both whole and fractional, between and including the aforementioned values, are hereby expressly contemplated for use herein.

In various embodiments, (1) includes two primary amine groups. In other embodiments, (1) includes more than two primary amine groups, e.g. 3 or 4, or even more. In still other embodiments, (1) includes at least one, e.g. 2, 3, 4, or more, secondary and/or tertiary amine groups. In various embodiments, (1) is chosen from diethylenetriamine, triethylenetetramine, tetraethylene pentamine, methylbisaminopropylamine (MBAPA), hexamethylenediamine, and ethylenediamine. In one embodiment (1) is chosen from polyalkyleneamines, polyalkyleneimines, and combinations thereof. In another embodiment, (1) is chosen from diethylenetriamine (DETA), triethylenetetramine (TETA), tetraethylenepentamine (TEPA), pentaethylenehexamine (PEHA), dipropylenetriamine (DPTA), tripropylenetetramine (TPTA), tetrapropylenepentamine (TPPA), pentapropylenehexamine (PPHA), dihexmethylenetriamine (DHMTA), methylbisaminopropylamine (MBAPA), hexamethylenediamine, ethylenediamine, and combinations thereof. In another embodiment, (1) is chosen from polyethylenepolyamines, polyalkylenepolyamines, and combinations thereof. In a further embodiment, (1) is diethylenetriamine (DETA).

In other embodiments, (1) may be any polyamine having three or more amine groups and can have a molecular weight up to about 4,000 but typically up to about 800. In various non-limiting embodiments, all values and ranges of values, both whole and fractional, between and including the aforementioned values, are hereby expressly contemplated for use herein.

Also, (1) may include a minor amount of less than about 50 weight percent of a polyamine of diamines such as ethylenediamine and the like. The preparation of these materials is well known in the art and can be prepared by any of the known methods. For example, (1) may be formed using an alkylene dihalide and ammonia. Commercially available polyalkylenepolyamines which may be used can be mixtures of polyalkylenepolyamine homologs. For example, polyethylenepolyamines can be used. It is also possible to use polyalkylenepolyamines having both ethylene and propylene groups. Such mixed polyalkylenepolyamines can be readily prepared, for example, by condensing ethylene diamine with one more proportions of acrylonitrile to form N-cyanoethyl ethylenediamine which can then be reduced, for example, by catalytic hydrogenation, to form a mixed alkylene polyamine.

Also, (1) may be one or more polyalkyleneimines where the alkyl portion of the molecule can have from 2 to about 12 carbon atoms such as polyethyleneimine, polypropyleneimine, polybutyleneimine, and the like that can have a molecular weight of about 800 up to about 50,000 or higher. These polyalkylenimines can be prepared by any method known to those skilled in the art. In various non-limiting embodiments, all values and ranges of values, both whole and fractional, between and including the aforementioned values, are hereby expressly contemplated for use herein.

(2) At Least One Chain Extender

As first introduced above, (2) is at least one chain extender having at least two carboxyl groups. In various embodiments, (2) is chosen from oxalic acid, succinic acid, glutaric acid, adipic acid, azelaic acid, sebacic acid, dodecanedioic acid, C36 dimer acids, and combinations thereof. In other embodiments, (2) is chosen from adipic acid, glutaric acid, succinic acid, and combinations thereof.

In various embodiments, (2) may include about 2 to about 40, about 2 to about 38, about 2 to about 36, about 4 to about 34, about 6 to about 32, about 8 to about 30, about 10 to about 28, about 12 to about 26, about 14 to about 24, about 16 to about 22, about 18 to about 20, about 12 to about 20, about 12 to about 18, about 12 to about 16, about 12 to about 14, about 14 to about 18, about 14 to about 16, or about 16 to about 18, carbon atoms. In various non-limiting embodiments, all values and ranges of values, both whole and fractional, between and including the aforementioned values, are hereby expressly contemplated for use herein.

In various embodiments, the terminology "chain-extender" describes a reactant that reacts with (1) and/or (3) to increase the molecular weight of the reaction product predominantly via its difunctionality so that the molecular linkages are more spaced apart from each other as opposed to tight-knit crosslinks that can result in gelation. The reaction between (1) and (2) can occur either at primary amine groups at the ends of the polyamide oligomer backbone or with any primary and/or secondary amines along the polyamide oligomer backbone. In various embodiments, the reaction predominantly occurs at the ends of the polyamide oligomer backbone and reaction along the polyamide oligomer backbone only occurs to a minor extent. Some of these compounds also may lead to the formation of imidazolines, as described in greater detail below.

In various embodiments, the (2) chain extender is chiefly difunctional in reaction with (1) but a minor amount of a polyfunctional can be present that can react difunctionally with (1). In other embodiments, a carbon chain length between the at least two carboxyl groups is such that it allow production of at least water dispersible reaction product.

In various embodiments, (2) is chosen from oxalic acid, alonic acid, succinic acid, glutaric acid, adipic acid, pimelic acid, and combinations thereof. In other embodiments, (2) is chosen from oxalic acid, malonic acid, succinic acid, glutaric acid, adipic acid, pimelic acid, azelaic acid, sebacic acid, dodecanedioic acid, C36 dimer acids, dimethyl glutarate, diesters thereof, and combinations thereof. In other embodiments, (2) is chosen from adipic acid, dimethyl glutarate, and combinations thereof (3) At Least One Hydrophobic End-Capper Referring now to (3), the at least one hydrophobic end-capper is chosen from a fatty acid, an ester of a fatty acid, a fatty acid chloride, a fatty alkyl halide, an epoxide of a hydrocarbon, a carboxylic acid anhydride of a hydrocarbon, and combinations thereof, any one or more of which has from 4 to about 40 carbon atoms.

In any one or more of the above, the number of carbon atoms may be about 4 to about 40, about 6 to about 38, about 8 to about 36, about 10 to about 34, about 12 to about 32, about 14 to about 30, about 16 to about 28, about 18 to about 26, about 20 to about 24, about 22 to about 24, about 18 to about 20, about 12 to about 20, about 12 to about 18, about 12 to about 16, about 12 to about 14, about 14 to about 18, about 14 to about 16, or about 16 to about 18, carbon atoms. In various non-limiting embodiments, all values and ranges of values, between and including the aforementioned values, are hereby expressly contemplated for use herein. It is also believed that the hydrophobic end-caps have a "debonding" effect on cellulose fibers that softens the resulting tissue.

In one embodiment, the at least one hydrophobic end-capper is the fatty acid having about 12 to about 20 carbon atoms, e.g. about 14 to about 20, about 14 to about 18, about 14 to about 16, about 12 to about 18, about 12 to about 16, about 12 to about 14, about 16 to about 20, or about 16 to about 18, carbon atoms. In another embodiment, the fatty acid is chosen from caprylic acid, pelargonic acid, capric acid, lauric acid, myristic acid, palmitic acid, stearic acid, isostearic acid, linoleic acid, oleic acid, and combinations thereof. In another embodiment, the fatty acid is chosen from stearic acid, oleic acid, and combinations thereof. In various non-limiting embodiments, all values and ranges of values, both whole and fractional, between and including the aforementioned values, are hereby expressly contemplated for use herein.

Non-limiting examples of the ester of a fatty acid include the methyl and/or ethyl esters of caprylic acid, pelargonic acid, capric acid, lauric acid, myristic acid, palmitic acid, stearic acid, isostearic acid, linoleic acid, oleic acid and combinations thereof.

Non-limiting examples of the fatty acid chloride include the acid chloride of caprylic acid, pelargonic acid, capric acid, lauric acid, myristic acid, palmitic acid, stearic acid, isostearic acid, linoleic acid, oleic acid and combinations thereof.

Non-limiting examples of the fatty alkyl halide include the mono-chloro, mono-bromo, or mono-iodo substituted alkyl chains of octane, nonane, decane, undecane, dodecane, tridecane, tetadencce, pentadecane, hexadecane, hepadecane, oxtadecane, nonadecane, eicosane, heneicosane, docosane, and combinations thereof. Moreover, the substitution may occur on any carbon on the chain, and the chain may also contain one or more degrees of unsaturation. Other non-limiting examples may include aromatic alkyl halides such as benzyl-chloride, benzyl-bromide, etc.

Non-limiting examples of the epoxide of a hydrocarbon include the 1-2 expoxides of octane, nonane, decane, undecane, dodecane, tridecane, tetradecane, pentadecane, hexadecane, hepadecane, octadecane, nonadecane, eicosane, heneicosane, docosane, and combinations thereof. Additional non-limiting examples include the glycidyl ethers of mono-alcohols based on octane, nonane, decane, undecane, dodecane, tridecane, tetadencce, pentadecane, hexadecane, hepadecane, oxtadecane, nonadecane, eicosane, heneicosane, docosane, and combinations thereof. Moreover, the substitution may occur on any carbon on the chain, and the chain may also contain one or more degrees of unsaturation. Other non-limiting examples may include glycidyl ethers of aromatic alkyl alcohols such as benzyl alcohol, etc.

Non-limiting examples of the carboxylic acid anhydride of a hydrocarbon include the dimer acid anhydrides of caprylic acid, pelargonic acid, capric acid, lauric acid, myristic acid, palmitic acid, stearic acid, isostearic acid, linoleic acid, oleic acid and combinations thereof. Moreover, the anhydrides don't have to be symmetrically substituted, but one familiar with the art will recognize that an asymmetric anhydride of a long and short chain acid will result in a mixture of substitution products.

In various embodiments, (3) reacts with (1) and (2) to form hydrophobic end-caps on the polyamide oligomer backbone. The end-caps may be the same or different. In various embodiments, the hydrophobic end-caps are capable of reaction with primary amine groups on the polyamide oligomer backbone and may be derived from a fatty acid, fatty acid chloride, an epoxide of a long chain hydrocarbon, a long hydrocarbon chain alkyl halide or aldehyde, a carboxylic acid anhydride of a long chain hydrocarbon, or an ester of a fatty acid. Additional examples of hydrophobic end-caps that can react with the amine groups on the polyamide oligomer backbone are described in U.S. patent application 2019/0031802, which is expressly incorporated herein by reference in various non-limiting embodiments. In various embodiments, the hydrophobic end-caps are derived from a fatty acid such as those used to make alkyl ketene dimers (AKDs) as would be appreciated by the skilled person. Non-limiting examples of fatty acid used to make AKDs are described in U.S. Pat. No. 4,240,935, which is expressly incorporated herein by reference in various non-limiting embodiments. Non-limiting additional examples of fatty acids used to make AKDs include: caprylic acid, pelargonic acid, capric acid, lauric acid, myristic acid, palmitic acid, stearic acid, isostearic acid, linoleic acid, or oleic acid. In various embodiments, the most typical fatty acids can include: lauric acid, myristic acid, palmitic acid, stearic acid, and/or oleic acid.

In various embodiments, a hydrocarbon chain of the hydrophobic end-caps includes from about 4 to about 40, about 6 to about 38, about 8 to about 36, about 10 to about 34, about 12 to about 32, about 14 to about 30, about 16 to about 28, about 18 to about 26, about 20 to about 24, about 22 to about 24, about 18 to about 20, about 12 to about 20, about 12 to about 22, about 12 to about 18, about 12 to about 16, about 12 to about 14, about 14 to about 18, about 14 to about 16, or about 16 to about 18, carbon atoms. In various non-limiting embodiments, all values and ranges of values, between and including the aforementioned values, are hereby expressly contemplated for use herein.

Typically, the reaction product of (1), (2), and (3) comprises a hydrophobic substitution of at least about 25 mole percent of the hydrophobic end-capper based on a total number of moles of active amine sites of the reaction product. Active amine sites are understood by those familiar with the art as the reactive primary and secondary amines which remain present after the polyamide forming condensation reaction between (1) and (2). This is a hypothetical value, and it does not describe the sequence of reactions taking place in the process, but rather provides a way to describe the level of hydrophobic substitution. In other embodiments, the amount is from about 25 to about 95, about 30 to about 80, about 32 to about 70, about 35 to about 60, about 37 to about 50, about 38 to about 45 mole percent of the hydrophobic end-capper based on a total number of moles of active amine sites of the reaction product. In various other embodiments, this amount is at least about 25, 30, 35, 40, 45, 50, 55, 60, 65, 70, 75, 80, 85, 90, or 95, or more, mole percent of the hydrophobic end-capper based on a total number of moles of active amine sites of the reaction product. In various non-limiting embodiments, all values and ranges of values, both whole and fractional, between and including the aforementioned values, are hereby expressly contemplated for use herein.

In various embodiments, a molar ratio of hydrophobic end-caps to primary amine groups on the polyamide oligomer backbone is at least about 0.5:1, about 0.75:1, about 0.9:1, about 0.95:1, about 1:1, about 1.1:1, about 1.25:1, about 1.5:1, about 1.75:1, about 1.9:1, or about 2:1, or any range thereof. In various non-limiting embodiments, all values and ranges of values, both whole and fractional, between and including the aforementioned values, are hereby expressly contemplated for use herein.

In various embodiments, the hydrophobic softener has a percent actives of from about 10 to about 100, about 20 to about 90, about 30 to about 80, about 40 to about 70, about 50 to about 60 percent actives, based on the percent weight of hydrophobically modified polyamide in the formulation as it is to be shipped. In various non-limiting embodiments, all values and ranges of values, both whole and fractional, between and including the aforementioned values, are hereby expressly contemplated for use herein.

Imidazoline Cyclization Adduct

As first introduced above, in various embodiments, the hydrophobic softener and/or reaction product may be, include, consist essentially of, or consist of, the aforementioned hydrophobic end-capped polyamide oligomer backbone with one or more imidazoline cyclization adducts incorporated into the structure. Alternatively, the hydrophobic softener and/or reaction product may be free of, or include less than, 10, 9, 8, 7, 6, 5, 4, 3, 2, 1, 0.5, or 0.1, weight percent of an imidazoline cyclization adduct based on a total weight of the hydrophobic softener and/or based on a total weight of the composition. In various non-limiting embodiments, all values and ranges of values, both whole and fractional, between and including the aforementioned values, are hereby expressly contemplated for use herein. The structure of such imidazoline cyclization adducts are appreciated by the skilled person.

In one embodiment, the hydrophobic softener and/or reaction product includes the hydrophobic end-capped polyamide oligomer backbone and an imidazoline cyclization adduct.

In one embodiment, the hydrophobic softener and/or reaction product consists essentially of the hydrophobic end-capped polyamide oligomer backbone and an imidazoline cyclization adduct.

In one embodiment, the hydrophobic softener and/or reaction product consists of the hydrophobic end-capped polyamide oligomer backbone with multiple imidazoline cyclization adducts.

In one embodiment, the hydrophobic softener and/or reaction product includes the hydrophobic end-capped polyamide oligomer backbone with multiple imidazoline cyclization adducts.

In one embodiment, the hydrophobic softener and/or reaction product consists essentially of the hydrophobic end-capped polyamide oligomer backbone with multiple imidazoline cyclization adducts.

In one embodiment, the hydrophobic softener and/or reaction product consists of the hydrophobic end-capped polyamide oligomer backbone and an imidazoline cyclization adduct.

The hydrophobic softener and/or reaction product may include any amount of the imidazoline cyclization adduct, e.g. about 5, 10, 15, 20, 25, 30, 35, 40, 45, 50, 55, 60, 65, 70, 75, 80, 85, 90, or 95, mole percent of the imidazoline cyclization adduct based on the total available sites hypothetically capable of forming imidazolines on the hydrophobic softener and/or reaction product. In other embodiments, the amount is from about 5 to about 95, about 10 to about 90, about 15 to about 85, about 20 to about 80, about 25 to about 75, about 30 to about 70, about 35 to about 65, about 40 to about 60, about 45 to about 55, or about 45 to about 50, weight percent of the imidazoline cyclization adduct based on a total weight of the hydrophobic softener and/or reaction product. In various non-limiting embodiments, all values and ranges of values, both whole and fractional, between and including the aforementioned values, are hereby expressly contemplated for use herein.

Alternatively, the hydrophobic softener and/or reaction product may be free of, or include less than 10, 9, 8, 7, 6, 5, 4, 3, 2, 1, 0.5, or 0.1, mole percent of, the imidazoline cyclization adduct, based on the total available sites hypothetically capable of forming imidazolines on the hydrophobic softener and/or reaction product. In various non-limiting embodiments, all values and ranges of values, both whole and fractional, between and including the aforementioned values, are hereby expressly contemplated for use herein.

Non-Ionic Surfactant

In this disclosure, the composition may include, or be free of, a non-ionic surfactant. In various embodiments, the terminology "free of" describes embodiments where the composition includes less than 5, 4, 3, 2, 1, 0.5, or 0.1, weight percent of the non-ionic surfactant based on a total weight of the composition. Alternatively, the composition may be totally free of the non-ionic surfactant (i.e., include about zero weight percent of the non-ionic surfactant).

In various embodiments, this non-ionic surfactant is chosen from mono-fatty esters and ethers of polyethylene glycol and combinations thereof. However, the non-ionic surfactant is not limited to such a genus and may include any non-ionic surfactant known in the art.

In various embodiments, a non-ionic surfactant may be included as a supplemental additive. For example, the presence of a non-ionic surfactant may act as an adhesive plasticizer/modifier in a drier-release formulation. However, the present disclosure is not reliant on the inclusion of non-ionic surfactants in order to achieve softness performance equivalent to or better than traditional DES- and/or DMS-containing softeners, nor is the present disclosure reliant on non-ionic surfactants for product stability.

Additives

It is also contemplated that the composition may include, or be free of, one or more additives. For example, the additives may be those conventionally added to the stock in paper or board production, such as processing aids (e.g., retention aids, drainage aids, contaminant control additives, flocculants, defoamers, etc.) or other functional additives. (e.g., wet or dry strength additives, temporary wet strength additives, dyes, optical brightening agents, sizing additives, etc.)

Stabilizer Package

The composition may also include, or be free of, a stabilizer package. The stabilizer package typically acts to maintain the softener in a form which is readily useable by the customer. Typically, it is typical that the product either remain a single-phase liquid or as a stable (non-settling, non-gelling) emulsion. The viscosity should be low enough to allow easy pumping and facile dilution into the process water.

In various embodiments, the stabilizer package is, includes, consists essentially of, or consists of, acetic acid, propylene glycol, and water.

In one embodiment, the stabilizer package includes acetic acid, propylene glycol, and water.

In another embodiment, the stabilizer package consists essentially of acetic acid, propylene glycol, and water.

In a further embodiment, the stabilizer package consists of acetic acid, propylene glycol, and water.

Instead of, or in addition to, the acetic acid, the stabilizer package may include lactic acid, glycolic acid, hydrochloric acid, sulfuric acid, phosphoric acid, fatty acids such as oleic acid, other low molecular weight organic acids, or combinations thereof.

Instead of, or in addition to, the propylene glycol, the stabilizer package may include glycerol, dipropylene glycol, alcohols, or combinations thereof.

In various embodiments, the acetic acid, propylene glycol, and water (or any one or more of the aforementioned alternative options) are present in the stabilizer package in a weight ratio which may be described in one or more parts. For example, in various embodiments, a weight ratio of water to propylene glycol (or any one or more of the aforementioned alternative options) may be from about 2:1 to about 1:2, e.g. about 1:1. In other embodiments, an amount of acetic acid may be chosen based on pH with a pH, e.g. of from about 4 to about 7, about 4.5 to about 6.5, about 5 to about 6, about 5 to about 5.5, or about 5.5 to about 6. In still other embodiments, the weight ratio of the acetic acid, propylene glycol, and water (or any one or more of the aforementioned alternative options) is (about 1 to about 1.5): (about 1): (about 0.5 to about 1.5). In various non-limiting embodiments, all values and ranges of values, both whole and fractional, between and including the aforementioned values, are hereby expressly contemplated for use herein.

Method of Improving Softness of Tissue and/or Towel Products

As first introduced above, this disclosure also provides a method of improving softness of tissue and/or towel products. The method includes the steps of providing the lignocellulosic fibers; providing the water; providing the hydrophobic softener; combining the lignocellulosic fibers, the water, and the hydrophobic softener; and creating the tissue and/or towel products using the combination of the lignocellulosic fibers, the water, and the hydrophobic softener.

The steps of providing are not particularly limited and may be any known in the art, e.g. providing independently from one another, providing as a combination of one or more components together, etc. Similarly, the step of combining is not particularly limited and may be further defined as providing one or more components alone or in combination with any one or more other components sequentially or simultaneously and in either a batch or continuous method.

In one embodiment, the step of combining is further defined as combining the water and the hydrophobic softener with the lignocellulosic fibers that are dispersed in process water.

In another embodiment, the step of combining is further defined as applying the water and the hydrophobic softener onto the lignocellulosic fibers via spray, direct contact, or foam application, or by employing an applicator felt.

In another embodiment, the lignocellulosic fibers are in the form of a wet-web of fibers.

In a further embodiment, the lignocellulosic fibers are disposed on a drier, such as a Yankee drier, e.g. optionally along with an adhesive. In this case, the product may act as a release while also being simultaneously transferred to the sheet where it provides a surface softening effect.

Relative to the step of creating the tissue and/or towel products using the combination of the lignocellulosic fibers, the water, and the hydrophobic softener, this step is not particularly limited and may include any one or more steps known in the art to be involved in papermaking. The hydrophobic softener having a charge, usually cationic, can be supplied to the furnish prior to web formation, applied directly onto the partially dewatered web or may be applied by both methods in combination. Additionally, the hydrophobic softener may be applied as part or all of the Yankee coating package during the creping process. Alternatively, the hydrophobic softener may be applied to the completely dried, creped sheet, either on the paper machine or during the converting process. The inclusion or combination of any one, multiple, or all of these application points are envisioned with the present disclosure.

Hydrophobic softeners that are added to the furnish prior to its formation into a web have been found to be particularly effective in producing soft tissue products and constitute a typical embodiment of this disclosure. These may be introduced directly to the process water containing the cellulosic fibers, or typically, the hydrophobic softener may first be diluted to a low consistency prior to application in order to improve distribution. The hydrophobic softeners may be introduced in the blenders and pumps very early in the process, directly into the machine chest or head box, or in the former section.

Treatment of the partially dewatered web with the hydrophobic softener can be accomplished in various ways. For instance, the treatment step can constitute spraying, applying with a direct contact applicator, foam application, or by employing an applicator felt. It is often typical to supply the hydrophobic softener to the air side of the web so as to avoid chemical contamination of the paper making process. In various embodiments, it has been found in practice that a hydrophobic softener applied to the web from either side penetrates the entire web and uniformly treats it.

Inclusion of the hydrophobic softener in the Yankee drier coating package may provide improvements in both softness and crepe quality. In this embodiment, it is envisioned that the hydrophobic softener both functions as a release aid and, at least some portion of the material will be transferred to the sheet where it may provide surface lubricity and softness. Here, the hydrophobic softener is typically diluted to a homogenous, low-solids aqueous dispersion, typically about 0.1 to about 2% solids. It would typically be applied to the drier prior to the drier's contact with the sheet. The hydrophobic softener is typically applied via spray as part of the entire coating package solution, which may contain adhesives, other release aides, rheological modifiers, crosslinkers, plasticizers, dyes, passivators, adhesion promotors, etc. The hydrophobic softener may also be applied separately or with a partial blend of the aforementioned coating components.

The hydrophobic softener may also be applied in a post-drying or converting operation. Typically, the hydrophobic softener would be applied in a dilute solution balanced to allow for homogeneous application without oversaturating the sheet. The hydrophobic softener may optionally be included as part or all of a topical lotion application which may include lotionizing components known to those familiar with the art. The sheet may optionally be subjected to another drying process prior to future operations or use.

In various embodiments, a web is dewatered typically by an overall compaction process. The web is then typically adhered to a Yankee dryer. An adhesive is then typically added directly to the metal of the Yankee, and advantageously, it is typically sprayed directly on the surface of the Yankee dryer drum. Any suitable art recognized adhesive may be used on the Yankee dryer. Adhesives such as glyoxylated polyacrylamide, and polyaminoamides have been shown to provide high adhesion and are particularly suited for use in manufacture of a one-ply product. Typical release agents can be used in accordance with the present disclosure.

In various embodiments, the web is then creped from the Yankee dryer and optionally calendered. It can be necessary that a product have a relatively high machine direction stretch. The final product's machine direction stretch can be at least about 15%, typically at least about 18%. Usually the base sheets machine direction stretch is controlled by fixing the percent crepe and the finished products' cross direction stretch is impacted by embossing. The relative speeds between the Yankee dryer and the reel can be controlled such that a reel crepe of at least about 18%, more typically at least 20%, and most typically at least 25% is maintained. Creping is typically carried out at a creping angle of from about 65 to about 85 degrees, typically about 70 to about 80 degrees, and more typically about 75 degrees. The creping angle is defined as the angle formed between the surface of the creping blade's edge and a line tangent to the Yankee dryer at the point at which the creping blade contacts the dryer, assuming a rigid blade.

In various embodiments, the method includes the step of diluting the composition and/or hydrophobic softener with water, e.g. to form an emulsion in water prior to use in papermaking The concentration of the hydrophobic softener in the emulsion is not particularly limited and may be, for example, 10, 9, 8, 7, 6, 5, 4, 3, 2, 1, 0.5, or 0.1, weight percent based on a total weight of the emulsion. In various non-limiting embodiments, all values and ranges of values, both whole and fractional, between and including the aforementioned values, are hereby expressly contemplated for use herein.

In still other embodiments, the weight of the hydrophobic softener is from about 0.25 to about 20, about 0.5 to about 10, about 1 to about 5, about 2 to about 3.5, or about 2.5 to about 3, lbs. per ton of dry paper. In various non-limiting embodiments, all values and ranges of values, both whole and fractional, between and including the aforementioned values, are hereby expressly contemplated for use herein.

Additional Embodiments

In various additional embodiments, the reaction product may have the following general structure:

Fatty Acid(x)-(DETA-(Adipic Acid and/or Dimethyl glutarate))n-DETA-Fatty Acid(x) In the above, n is 1 to about 20, about 2 to about 19, about 3 to about 18, about 4 to about 17, about 5 to about 16, about 6 to about 15, about 7 to about 14, about 8 to about 13, about 9 to about 12, about 10 to about 11, about 1 to about 10, about 1 to about 5, about 1, 2, 3, 4, 5, 6, 7, 8, 9, or 10, about 1 to about 2, etc. Also, in the above, x is about 0.3 to about 1, about 0.4 to about 0.9, about 0.5 to about 0.8, about 0.6 to about 0.7, about 0.5 to about 1, about 0.6 to about 0.9, about 0.7 to about 0.8, about 0.9 to about 1, etc. In various non-limiting embodiments, all values and ranges of values, both whole and fractional, between and including the aforementioned values, are hereby expressly contemplated for use herein.

In other embodiments, the hydrophobic softener is described as a functional ingredient which is added to, and is retained by, the lignocellulosic fibers during the papermaking process. The instant disclosure may also be utilized in the production of fluff pulp to provide debonding and improved water absorptivity of the fibers.

In other embodiments, the hydrophobic softener includes three components: a diamine and a dicarboxylic acid which make up the polyamide oligomer backbone of the softener, and hydrophobic "end-caps." The hydrophobic polyamides can be made by the condensation polymerization of the three components using methods widely used to make polyamides for paper wet strength applications (Crisp et al., U.S. Pat. No. 9,719,212 which is expressly incorporated herein by reference in various non-limiting embodiments). However, they can be made by any of the methods known to those skilled in the art.

In various embodiments, the composition exhibits a reduced aquatic toxicity when compared to traditional DES- and DMS- based softeners. Traditional softeners containing permanently quaternized amine and imidazoline functionalities are considered both acutely and chronically very toxic to aquatic life, with long lasting effects. Various embodiments of this disclosure are significantly less toxic to aquatic life, exhibiting about 4 to at least about 10 times lower aquatic toxicity to various species of aquatic life, including but not limited to fathead minnow and *daphnia magna*, when compared on an equal actives basis to traditional DES-based softeners. Surprisingly, various embodiments that are tested exhibit improved aquatic toxicity over traditional quaternized softeners. This is particularly interesting in the context that these molecules still exhibit enough cationic charge for them to be fully retained on naturally anionic cellulosic fibers, and it is generally observed that the presence of cationic functionality negatively impacts aquatic toxicity. In various embodiments, this charge is not permanent and decreased as pH increases. Various molecules of this disclosure are likely less charged than quaternary imidazolines at a similar pH, such that it is likely that a reduced toxicity may be derived from this shift in charge density. Moreover, it is surprising that non-quat imidazoline-containing materials, which have a higher pKa, meaning they stay charged until the pH exceeds about 10 to about 11 can still show an about 1.5 to about 3× reduction in aquatic toxicity.

EXAMPLES

Various hydrophobic softeners and compositions were created and evaluated relative to improving softness of tissue and/or towel products. Each is described below.

Example 1

In a first example, a jacketed glass reaction vessel is outfitted with an overhead mixer, a water-cooled condenser, and a heated glass head. The heating jacket is set to 60° C. to drive out residual solvent and to make use of a reaction exotherm. Subsequently, the reactor is charged with dimethylglutarate. Then, DETA is charged over about 1 minute followed by the charging of oleic acid over about 1 minute. The temperature of the heating jacket is then elevated such that the reactor contents reach about 175° C. which may require about 1 hour. A nitrogen sparge is then utilized at a rate of about 0.1 L/min. While the reaction is still heating, the reactor head is heated to about 115° C. and is allowed to reach the desired temperature before reaction has reached the target temperature. Once the reaction has reached the target temperature, the components are then mixed for about 3 hours at temperature and a condensate is collected. The reaction mixture is then cooled to about 90-100° C. Acetic acid is then added over about 1 minute and the temperature exotherms to about 100-110° C. The reaction mixture is again allowed to cool to about 100° C. Propylene glycol is then added and allowed to mix for about five or more minutes. Water is then added over about 1 minute. The reactor is then cooled and emptied. In this first experiment, the following amounts of the aforementioned components are utilized:

| Scale: 100 g | | | |
| --- | --- | --- | --- |
| Component | MW | Eq | Scaled |
| Dimethyl Glutarate | 160.17 | 1.000 | 14.34 g |
| DETA | 103.17 | 1.667 | 15.40 g |
| Oleic Acid | 282.46 | 1.267 | 32.04 g |
| Methanol Removed | 32.04 | −2.000 | −5.74 g |
| Water Removed | 18.02 | −1.267 | −2.04 g |
| Acetic Acid | 60.052 | 5.000 | 17.03 g |
| Propylene Glycol | Percent | 26.83% | 14.49 g |
| Water | Percent | 26.83% | 14.49 g |
| | | Total | 100.00 g |

This experiment produced a copolymer that has the following final percentages.

| Final Percentages | |
| --- | --- |
| Active Polyamide | 54.00% |
| Acetic Acid | 17.03% |
| Propylene Glycol | 14.49% |
| Water | 14.49% |

Evaluation of Composition of Example 1

After formation, the composition of Example 1 was evaluated to determine tensile strength reduction, deflection, and surface softness. The results of these evaluations were compared to results obtained from evaluating a comparative composition. More specifically, Example 1 was compared to a commercial softener product, ProSoft TQ250, which is a typical tissue softener based on DETA and oleic acid and which relies on the use of diethyl sulfate to impart a permanent quaternary charge.

The results of these comparisons are set forth in FIGS. 1A, 1B, and 1C.

Notably, the data set forth in FIGS. 1A and 1B was derived from treating a pre-formed, dry tissue with a topical spray and exemplifies a converting operation. The data set forth in FIG. 1C is derived from producing handsheets and exemplifies wet-end addition. This example suggests that the product is retained on the fibers even though it does not have "permanent" cationicity.

Example 2

In a second experiment, the same procedure as described above is carried out using the following components. In this experiment, the adipic acid is added as a powder, and there is larger exotherm associated with the acid-base interaction which occurs between DETA and Adipic Acid.

| Scale: 100 g | | | |
| --- | --- | --- | --- |
| Component | MW | Eq | Scaled |
| Adipic Acid | 146.14 | 1 | 13.26 g |
| DETA | 103.17 | 1.667 | 15.61 g |
| Oleic Acid | 282.46 | 1.267 | 32.48 g |
| Water Removed | 18.02 | −3.3333 | −5.45 g |
| Acetic Acid | 60.052 | 4.00 | 14.10 g |
| Propylene Glycol | Percent | 26.83% | 15.00 g |
| Water | Percent | 26.83% | 15.00 g |
| | | Total | 100.00 g |

This experiment produced a copolymer that has the following final percentages.

| Final Percentages | |
| --- | --- |
| Active Polyamide | 55.90% |
| Acetic Acid | 14.10% |
| Propylene Glycol | 15.00% |
| Water | 15.00% |

These examples exhibit superior and unexpected benefits associated with manufacturing processes and shipping of these products that are substantially more efficient than what would be expected. Moreover, Example 1 shows superior and unexpected retention of the hydrophobic softener in wet-end application due to blending with the fibers and water before making a hand-sheet on a dynamic sheet former.

Additional Examples were also prepared as described below.

Example A—Preparation of a 2:1:1.9 DETA:Adipic Acid:Stearic Acid Hydrophobic Polyamide To a 1-liter, 4-necked flask fitted with an addition funnel, Dean-Stark trap/condenser, overhead stirrer, and thermocouple thermometer were added: 18.1 g of adipic acid (0.124 mol) and 66.4 g of stearic acid (0.233 mol). 25.5 g of DETA (0.247 mol) was added to the stirred mixture using a large pipette. The resulting slurry was then heated to 175° C. using a heating mantle. At this point, the reaction mixture was clear and amber in color. Heating was continued for an additional three hours after the mixture reached 175° C. A slow nitrogen flow was initiated after one hour of heating to drive water away from the reaction flask. 8.1 g of water was collected in the Dean-Stark trap.

The thermocouple set point was then reduced to 120° C., and the reaction mixture was allowed to cool. The addition of acidified dilution water was initiated as the reaction temperature fell below 140° C. (comprised of 12.4 g concentrated $H_2SO_4$ (0.95 equivalents) and 738 g of water). The dilution water was added slowly to avoid excessive boiling and bumping of the reaction mixture. After the mixture cooled below 100° C. and the boiling had subsided, the dilution water addition was maintained at a rate that kept the reaction temperature above 85° C. (dilution water addition required—one hour). Once the addition of the dilution water was complete, the emulsified product was stirred at 90° C. for one additional hour.

Example B—Emulsification of a 2:1:1.9 DETA:Adipic Acid:Stearic Acid Hydrophobic Polyamide A 50 g sample of the 2:1:1.9 DETA:adipic acid:stearic acid hydrophobic polyamide softener described in Example A was heated in an 80° C. oven for one hour. A 98 g aliquot of distilled water was loaded into a blender jar and heated in a water bath to 80° C. The hot jar was then removed from the bath and 2 g of the 2:1:1.9 DETA:adipic acid:stearic acid polyamide were added. The hot mixture was immediately blended on "high" for 60 seconds. The blended emulsion was allowed to cool to room temperature. The particle size (241 nm) and zeta potential (+55 mV) of the emulsion (notebook number X-00174-87) were measured using the Wyatt Mobius unit located at the University of Delaware's ISE Lab (Newark, Delaware).

Example C—Surface Addition of Hydrophobic Polyamide Softener Emulsions to Creped Tissue Rolls of commercial bath tissue were surface treated with an emulsion of a 2:1:1.9 DETA:adipic acid:oleic acid hydrophobic polyamide made using the methods described in Examples A and B. A Little Giant Speedy Label Maker offset printing press (Sohn Manufacturing Inc. Elkhart Lake, Wisconsin) was used to apply the emulsion. A single-ply creped tissue paper available from Office Depot was used for the evaluations (Kimberly-Clark-Professional®, continuous roll).

The amount of hydrophobic polyamide softener added to the tissue was controlled by adjusting the % solids of the emulsion. The % solids of the emulsion was selected based on the % wet "pick-up" of the tissue on the off-set press and the desired softener addition level. All emulsions were adjusted to pH 5.5 prior to testing. Wet pick-up was calculated using the difference in the dry weight of the tissue before printing and the wet-weight of the tissue after printing. For example, a 2.5% solids emulsion at 10% wet pick-up gave a softener addition level of 0.25% or 5 pounds per ton (ppt) of treated tissue. The softener treated tissue was dried for 30 minutes at 90° C., then allowed to equilibrate at 50% relative humidity and 72° C. overnight prior to testing.

Example D—Softness Testing of Hydrophobic Polyamide Treated Tissue—DETA:Adipic Acid:Oleic Acid Three hydrophobic polyamides were made using the method described in Example A and emulsified using the method described in Example B. As listed in the table of FIG. 2, the polyamide softeners tested were made at DETA:adipic acid:oleic acid ratios of: 2:1:1.9, 5:3:3.8, and 3:2:1.9.

The hydrophobic polyamide emulsions were evaluated for softness performance using the surface addition method described in Example C. Three separate studies were carried out to test the softeners at addition levels of 2 pounds per ton (ppt), 3 ppt, and 4 ppt based on the dry weight of treated tissue. ProSoft TQ218 (a commercial tissue softener available from Solenis Inc., Wilmington, DE) was evaluated as a commercial softener control over the same range of addition levels. Hercobond 1194 (addition level fixed at 4 ppt, a commercial temporary wet strength resin available from Solenis Inc., Wilmington, DE) was added to the tissue along with each of the softeners on all runs. A sample of Herco-bond 1194 treated tissue made without the addition of a softener was tested as control. An Emtec Tissue Softness Analyzer (TSA, Leipzig, Germany) was used to quantify the softness of the treated tissue. The TSA-S7 (a lower value implies softer tissue) and TSA-D[mm/N] (a higher value implies softer tissue) measurements were used to quantify the softness of the treated tissue. A listing of the softeners, addition amounts, and the corresponding softness results are listed in the table of FIG. 2.

Consistent with commercial experience, adding ProSoft TQ218 to the temporary wet strength treated tissue improved TSA-S7 and TSA-D[mm/N] softness. All three hydrophobic polyamide softeners gave improvements in softness comparable to those obtained with ProSoft TQ218 over the entire range of addition levels tested.

Example E—Softness Testing of Hydrophobic Polyamides Made Over a Wide Range of DETA:Adipic Acid:Oleic Acid Ratios—Oleic Acid Fixed at a Ratio of 1.9

Six hydrophobic polyamides were made using the method described in Example A and emulsified using the method described in Example B. As listed in the table of FIG. 3, the polyamide softeners tested were made at DETA:adipic acid: oleic acid ratios of: 3:2:1.9, 5:4:1.9, 7:6:1.9, 9:8:1.9, and 11:10:1.9.

Particle size and zeta potential testing showed that the hydrophobic polyamides gave emulsions with particle sizes between 60 and 100 nanometers (nm) and zeta potential between +30 and +35 millivolts (mV) (tested using the Wyatt Mobius unit located at the University of Delaware's ISE Lab (Newark, Delaware), The testing was carried in de-ionized water). Some of the hydrophobic polyamide emul-sions remained well dispersed after one month of aging at room temperature. One particular hydrophobic polyamide had the best stratification stability. Another hydrophobic polyamide was soluble in water, and was not tested for particle size or zeta potential. The solution remained stable after one month of aging.

The hydrophobic polyamide emulsions were then evalu-ated for softness performance using the surface addition method described in Example C. ProSoft TQ218 (a com-mercial tissue softener available from Solenis Inc., Wilm-ington, DE) was evaluated as a commercial softener control. The softener addition level was fixed at 2 ppt. Hercobond 1194 (fixed at 4 ppt, a commercial temporary wet strength resin softener available from Solenis Inc., Wilmington, DE) was added to the tissue along with each of the softeners on all runs. A sample of Hercobond 1194 treated tissue made without the addition of a softener was tested as control.

An Emtec Tissue Softness Analyzer (TSA, Leipzig, Ger-many) was used to quantify the softness of the treated tissue. The TSA-S7 (a lower value implies softer tissue) and TSA-D[mm/N] (a higher value implies softer tissue) mea-surements were used to quantify the softness of the treated tissue. The results of Emtec TSA testing of the hydrophobic polyamide treated tissue are listed in the table of FIG. 3.

Consistent with commercial experience, adding ProSoft TQ218 to the Hercobond 1194 temporary wet strength treated tissue improved TSA-S7 and TSA-D[mm/N] soft-ness. The softness improvements obtained with the hydro-phobically modified polyamides increased as the "n" value of the polyamide decreased. The hydrophobically modified polyamides made at the 3:2:1.9 and 5:4:1.9 DETA:Adipic acid:Oleic acid ratios gave TSA-S7 and TSA-D[mm/N] softness improvements close to those obtained with the ProSoft TQ218 control. The hydrophobic polyamide made at the 11:10:1.9 DETA:Adipic acid:Oleic acid ratio gave little or no improvement in TSA softness. The hydrophobic polyamides made at intermediate ratios (7:6:1.9 and 9:8:1.9 DETA:Adipic acid:Oleic acid, n=6 and 8) improved TSA-S7 and TSA-D-[mm/N] softness. The improvements in soft-ness, however, were smaller than those obtained with the ProSoft TQ218 control.

Example F—Softness Testing of Hydrophobic Polyamides Made Over a Wide Range of DETA:Adipic Acid:Oleic Acid Ratios—Oleic Acid Fixed at a Ratio of 1.5

Four hydrophobic polyamides were made using the method described in Example A and emulsified using the method described in Example B. As listed in the table of FIG. 4, the polyamide softeners tested were made at DETA: adipic acid:oleic acid ratios of: 2:1:1.5, 3:2:1.5, 5:4:1.5, and 9:8:1.5. All four hydrophobic polyamide emulsions made at n=1, 2, 4, and 8 remained well dispersed after one month of aging at room temperature. However, the polyamide emul-sions made with 1.5 parts of oleic acid generally stratified more quickly than the corresponding emulsion with made with 1.9 parts of oleic acid (compared to Example E).

The hydrophobic polyamide emulsions were then evalu-ated for softness performance using the surface addition method described in Example C. ProSoft TQ218 (a com-mercial tissue softener available from Solenis Inc., Wilm-ington, DE) was evaluated as a commercial softener control. The softener addition level was fixed at 2 ppt. Hercobond 1194 (fixed at 4 ppt, a commercial temporary wet strength resin softener available from Solenis Inc., Wilmington, DE) was added to the tissue along with each of the softeners on all runs. A sample Hercobond 1194 treated tissue made without the addition of a softener was tested as control.

An Emtec Tissue Softness Analyzer (TSA, Leipzig, Ger-many) was used to quantify the softness of the treated tissue. The TSA-S7 (a lower value implies softer tissue) and TSA-D[mm/N] (a higher value implies softer tissue) mea-surements were used to quantify the softness of the treated tissue. The results of Emtec TSA testing of the hydrophobic polyamide treated tissue are listed in the table of FIG. 4.

Consistent with commercial experience, adding ProSoft TQ218 to the Hercobond 1194 temporary wet strength treated tissue improved TSA-S7 and TSA-D[mm/N] soft-ness. The softness improvements obtained with the hydro-phobically modified polyamides increased as the "n" value of the polyamide decreased. The hydrophobically modified polyamides made at the 2:1:1.5 and 3:2:1.5 DETA:Adipic acid:Oleic acid ratios gave TSA-S7 and TSA-D[mm/N] softness improvements close to those obtained with the ProSoft TQ218 control. The hydrophobic polyamide made at the 5:4:1.5, and 9:8:1.5 DETA:Adipic acid:Oleic acid ratio gave little or no improvement in TSA softness.

Example G—Softness Testing of Hydrophobic Polyamides Made with Succinic Acid Over a Wide Range of DETA:Succinic Acid:Oleic Acid Ratios—Oleic Acid Fixed at a Ratio of 1.5

Four hydrophobic polyamides were made using the method described in Example A and emulsified using the method described in Example B. As listed in the table of FIG. 5, the polyamide softeners tested were made at DETA: succinic acid:oleic acid ratios of: 2:1:1.5, 4:3:1.5, 6:5:1.5, and 11:10:1.5.

The hydrophobic polyamide emulsions were then evaluated for softness performance using the surface addition method described in Example C. ProSoft TQ218 (a commercial tissue softener available from Solenis Inc., Wilmington, DE) was evaluated as a commercial softener control. The softener addition level was fixed at 5 ppt. A water treated sample of tissue was tested as a "Blank." A Thwing Albert Handle-o-Meter softness tester (H-o-M, West Berlin, New Jersey) was used to quantify the softness of the treated tissue (a lower H-o-M value implies softer tissue).

The results of H-o-M softness testing of the treated tissue are listed in the table of FIG. 5. Consistent with commercial experience, adding ProSoft TQ218 improved the softness of the tissue (versus the water treated Blank). The softness improvements obtained with the hydrophobically modified polyamides again increased as the "n" value of the polyamide decreased. The hydrophobically modified polyamide made at the 2:1:1.5 DETA:succinic acid:oleic acid ratio gave an improvement in H-o-M softness close to that obtained with the ProSoft TQ218 control. The hydrophobically modified polyamide made at the 4:3:1.5 DETA:succinic acid: oleic acid ratio gave a smaller but still significant improvement in H-o-M softness. The hydrophobically modified polyamides made at the 6:5:1.5 and 11:10:1.5 DETA: succinic acid:oleic acid ratios gave the smallest improvement in H-o-M softness.

Example H—Softness Testing of Hydrophobic Polyamides Made Over a Wide Range of DETA:Adipic Acid:Stearic Acid Ratios—Stearic Acid Fixed at a Ratio of 1.9

Five hydrophobic polyamides were made using the method described in Example A and emulsified using the method described in Example B. As listed in the table of FIG. 6, the polyamide softeners tested were made at DETA: adipic acid: stearic acid ratios of: 2:1:1.9, 3:2:1.9, 5:4:1.9, 7:6:1.9, and 9:8:1.9. All five hydrophobic polyamide emulsions made at n=1, 2, 4, 6, and 8 remained well dispersed after one month of aging at room temperature.

However, the polyamide emulsions made with stearic acid stratified more quickly than the corresponding emulsions made with oleic acid.

The hydrophobic polyamide emulsions were then evaluated for softness performance using the surface addition method described in Example C. ProSoft TQ218 (a commercial tissue softener available from Solenis Inc., Wilmington, DE) was evaluated as a commercial softener control. The softener addition level was fixed at 2 ppt. Hercobond 1194 (fixed at 4 ppt, a commercial temporary wet strength resin softener available from Solenis Inc., Wilmington, DE) was added to the tissue along with each of the softeners on all runs. A sample Hercobond 1194 treated tissue made without the addition of a softener was tested as control. pH was fixed at 5.5 on all runs.

An Emtec Tissue Softness Analyzer (TSA, Leipzig, Germany) was used to quantify the softness of the treated tissue. The TSA-S7 (a lower value implies softer tissue) and TSA-D[mm/N] (a higher value implies softer tissue) measurements were used to quantify the softness of the treated tissue. The results of Emtec TSA testing of the hydrophobic polyamide treated tissue are listed in the table of FIG. 6.

Consistent with commercial experience, adding ProSoft TQ218 to the Hercobond 1194 temporary wet strength treated tissue improved TSA-S7 and TSA-D[mm/N] softness. The softness improvements obtained with the hydrophobically modified polyamides increased as the "n" value of the polyamide decreased. The hydrophobically modified polyamides made at the 2:1:1.9, 3:2:1.9, 5:4:1.9 DETA: Adipic acid:Stearic acid ratios gave TSA-S7 and TSA-D [mm/N] softness improvements close to those obtained with the ProSoft TQ218 control. The hydrophobic polyamide made at the 7:6:1.9, and 9:8:1.9 DETA:Adipic acid: Stearic acid ratios gave little or no improvement in TSA softness.

Example I—Softness Testing of a Hydrophobic Polyamide Containing a C36 Dimer Acid—Use of Hydrophobic Polyamides as a Dispersant/Emulsifier Two hydrophobic polyamides were made using the method described in Example A: a 1.8:11:4:6 stearic acid: DETA:C36 dimer acid:adipic acid oligomer and a 1.8:11:10 stearic acid:DETA:adipic acid oligomer. The hydrophobic polyamide containing the C36 dimer acid (Pripol 1006, Croda Inc) was too hydrophobic to self-emulsify in water. The 1.8:11:10 stearic acid:DETA:adipic acid oligomer dispersed easily in water.

A stable 5% solids emulsion of the two polyamides was made by mixing 80 g of the hydrophobic polyamide containing the C36 dimer acid (5% solids) with 20 g the 1.8:11:10 stearic acid:DETA:adipic acid (5% solids) in a steam jacketed starch cooker set at 90° C. for 30 minutes. A subsequent study showed that the 1.8:11:10 stearic acid: DETA:adipic acid oligomer could also be used to disperse a microcrystalline wax in water (10% hydrophobic polyamide, 90% G-Wax, m.p. 60° C., Solenis Inc)).

The blended polyamide emulsion was evaluated for softness performance (addition level fixed at 4 ppt) using the surface addition method described in Example C (versus the softness of an untreated Blank). ProSoft TQ218 was evaluated as a control (addition level fixed at 4 ppt).

H-o-M, TSA-S7, and TSA-D[mm/N] were used as measures of softener performance. The results of softness testing are listed in Table 6. The blended polyamide emulsion gave H-o-M and TSA-D[mm/N] softness performance close to that of the ProSoft TQ218 control. It also gave a small improvement in TSA-S7 versus the untreated Blank.

The data demonstrated that both adipic acid and dimethyl glutarate served as viable choices. The products from these reactions are referred to as "Hydrophobically Modified Polyamides." The number of repeat units was customized in order to provide maximum performance while also maintaining excellent self-emulsfiability. It was discovered that a narrow operating window which gave performance which was equivalent to the existing technology and which was also stable and commercially viable product.

In order to achieve Prop 65 compliance and to improve the aquatic toxicology profile, DES/DMS alkylating agents were removed from the process. This resulted in products which showed poor emulsification properties and reduced softening effectiveness. In order to resolve these problems, a tunable hydrophilic polyamide component was integrated into the middle of the DETA/Oleic softening molecule. To this end, a diacid was included in the condensation step of the synthesis of these molecules.

More specifically, various embodiments of this disclosure exhibit about 4× to at least about 10× lower toxicity than comparative examples. As described above, it is surprising that these inventive compositions are less toxic despite the charge density of the softener, see e.g. the data set forth below which measures the Mutek charge density at pH 8:

| | Example 1 | Example 2 | Example E, 3:2:1.9 | ProSoft TQ250 |
|---|---|---|---|---|
| Diacid | DMG | Adipic | Adipic | N/A |
| Type | Inventive | Inventive | Inventive | Comparative DES-Softener |
| Avg Mw | ~931 g/mol | ~952 g/mol | — | ~691 g/mol |
| Theoretical Charge Density | 1.00 | 0.98 | — | 0.54 |
| Measured Relative Charge Density | 1.00 | 0.92 | — | 0.43 |
| Fathead Minnow (LC50, 96 hr) | 0.95 mg/mL | 1.72 mg/mL | 2.48 mg/mL | 0.66 mg/mL |
| Daphnia Magna (EC50, 72 hr) | 1.43 mg/mL | 1.88 mg/mL | 1.61 mg/mL | 0.16 mg/mL |

The aforementioned reported values have been corrected to compare equal actives.

LC50 indicates the concentration of test item estimated to cause mortality in 50% of the test organisms.

For *Daphnia magna*

Test Method: Organization for Economic Co-operation and Development (OECD). 2004. Guideline #202, "*Daphnia* sp., Acute Immobilization Test" OECD Guidelines for Testing of Chemicals. 48-h LC50 was determined by Spearman-Karber (CETIS) calculation method.

Testing followed the general conditions of the test method cited. The 20 mg/L (w/v) test solution was prepared by weighing an appropriate amount of the test item and gradually mixing thoroughly with control/dilution water until uniform. Appropriate amounts of the 20 mg/L test solution were mixed with control/dilution water to achieve the remaining desired test concentrations. Test solutions were mixed thoroughly prior to test initiation. Replicate data were pooled to calculate the reported results.

For Fathead Minnow

Test Method: Organization for Economic Co-operation and Development (OECD). June 2019. Guideline #203, "Fish, Acute Toxicity Test". OECD Guidelines for Testing of Chemicals. 96-h LC50 was determined by Binomial (CETIS) calculation method.

Testing followed the general conditions of the test method cited. The 200 mg/L (w/v) test solution was prepared by weighing an appropriate amount of the test item and mixing thoroughly with control/dilution water until uniform. Appropriate amounts of the 200 mg/L test solution were mixed with control/dilution water to achieve the remaining desired test concentrations. Test solutions were mixed thoroughly prior to test initiation.

The data set forth above show that the compositions demonstrate equal or improved softness compared to traditional DES- and DMS-based softeners. Furthermore, the data demonstrates that the softeners can be applied in a variety of traditional methods, where they repeatedly exhibited equal or improved performance. Moreover, the hydrophobic softeners exhibit significantly improved aquatic toxicity. This is particularly surprising, because these molecules contain enough cationic charge for them to be well retained in the wet-end application, (Example/FIG. 1C) and it is generally understood that the presence of cationic functionality may negatively impact aquatic toxicity.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A composition for improving softness of tissue and/or towel products, said composition comprising:
   A. lignocellulosic fibers;
   B. water; and
   C. a hydrophobic softener comprising the reaction product of reactants consisting of:
      (1) at least one di- and/or poly-amine;
      (2) at least one chain extender having at least two carboxyl groups; and
      (3) at least one hydrophobic end-capper chosen from a fatty acid, an ester of a fatty acid, a fatty acid chloride, a fatty alkyl halide, an epoxide of a hydrocarbon, a carboxylic acid anhydride of a hydrocarbon, and combinations thereof, any one or more of which has from 4 to about 40 carbon atoms, and
   wherein the reaction product comprises a hydrophobic substitution of at least about 25 mole percent of the hydrophobic end-capper based on a total number of moles of active amine sites of the reaction product.

2. The composition of claim 1 wherein the at one least di- and/or poly-amine is chosen from polyalkyleneamines, polyalkyleneimines, and combinations thereof.

3. The composition of claim 1 wherein the at least one di- and/or poly-amine is chosen from diethylenetriamine (DETA), triethylenetetramine (TETA), tetraethylenepentamine (TEPA), pentaethylenehexamine (PEHA), dipropylenetriamine (DPTA), tripropylenetetramine (TPTA), tetrapropylenepentamine (TPPA), pentapropylenehexamine (PPHA), and dihexmethylenetriamine (DHMTA), methylbisaminopropylamine (MBAPA), hexamethylenediamine, and ethylenediamine and combinations thereof.

4. The composition of claim 1 wherein the at least one di- and/or poly-amine is chosen from polyethylenepolyamines, polyalkylenepolyamines, and combinations thereof.

5. The composition of claim 1 wherein the at least one di- and/or poly-amine is diethylenetriamine (DETA).

6. The composition of claim 1 wherein the at least one chain extender is chosen from oxalic acid, malonic acid, succinic acid, glutaric acid, adipic acid, pimelic acid, azelaic acid, sebacic acid, dodecanedioic acid, C36 dimer acids, dimethyl glutarate, diesters thereof, and combinations thereof.

7. The composition of claim 1 wherein the at least one chain extender is chosen from adipic acid, dimethyl glutarate, and combinations thereof.

8. The composition of claim 1 wherein the at least one hydrophobic end-capper is the fatty acid having about 12 to about 20 carbon atoms.

9. The composition of claim 8 wherein the fatty acid is chosen from caprylic acid, pelargonic acid, capric acid, lauric acid, myristic acid, palmitic acid, stearic acid, isostearic acid, linoleic acid, oleic acid, and combinations thereof.

10. The composition of claim 8 wherein the fatty acid is chosen from stearic acid, oleic acid, and combinations thereof.

11. The composition of claim 1 wherein (1), (2), and (3) are reacted in a molar ratio of about (1 to 3):about 1:about (0.9 to 4).

12. The composition of claim 1 wherein the hydrophobic softener further comprises an imidazoline cyclization adduct of (1), (2), and (3).

13. The composition of claim 1 that is free of a non-ionic surfactant.

14. A method of improving softness of tissue and/or towel products, said method comprising the steps of:

A. providing lignocellulosic fibers;

B. providing water;

C. providing a hydrophobic softener;

D. combining the lignocellulosic fibers, the water, and the hydrophobic softener; and E. creating the tissue and/or towel products using the combination of the lignocellulosic fibers, the water, and the hydrophobic softener;

wherein the hydrophobic softener comprises the reaction product of reactants consisting of:

(1) at least one di- and/or poly-amine;

(2) at least one chain extender having at least two carboxyl groups; and (3) at least one hydrophobic end-capper chosen from a fatty acid, an ester of a fatty acid, a fatty acid chloride, a fatty alkyl halide, an epoxide of a hydrocarbon, a carboxylic acid anhydride of a hydrocarbon, and combinations thereof, any one or more of which has from 4 to about 40 carbon atoms, and wherein the reaction product comprises a hydrophobic substitution of at least about 25 mole percent of the hydrophobic end-capper based on a total number of moles of active amine sites of the reaction product.

15. The method of claim 14 wherein the step of combining is further defined as combining the water and the hydrophobic softener with the lignocellulosic fibers that are dispersed in process water.

16. The method of claim 14 wherein the step of combining is further defined as spraying the water and the hydrophobic softener onto the lignocellulosic fibers.

17. The method of claim 16 wherein the lignocellulosic fibers are in the form of a wet-web of fibers.

18. The method of claim 16 wherein the lignocellulosic fibers are disposed on a drier.

19. The method of claim 14 wherein the hydrophobic softener further comprises an imidazoline cyclization adduct.

20. A method of improving softness of tissue and/or towel products, said method comprising the steps of:

A. providing lignocellulosic fibers;

B. providing water;

C. providing a hydrophobic softener;

D. combining the lignocellulosic fibers, the water, and the hydrophobic softener; and E. creating the tissue and/or towel products using the combination of the lignocellulosic fibers, the water, and the hydrophobic softener;

wherein the hydrophobic softener comprises the reaction product of reactants consisting of:

(1) at least one di- and/or poly-amine;

(2) at least one chain extender having at least two carboxyl groups; and (3) at least one hydrophobic end-capper chosen from a fatty acid, an ester of a fatty acid, a fatty acid chloride, a fatty alkyl halide, an epoxide of a hydrocarbon, a carboxylic acid anhydride of a hydrocarbon, and combinations thereof, any one or more of which has from 4 to about 40 carbon atoms, wherein the reaction product comprises a hydrophobic substitution of at least about 25 mole percent of the hydrophobic end-capper based on a total number of moles of active amine sites of the reaction product, and wherein the hydrophobic softener further comprises an imidazoline cyclization adduct that is present in an amount of about 5 to about 95 mol % based on a total number of moles of the reaction product.

\* \* \* \* \*